(12) United States Patent
Jennings (10) Patent No.: US 8,834,303 B2
(45) Date of Patent: Sep. 16, 2014

(54) ARENA BASEBALL GAME SYSTEM (71) Applicant: James Edward Jennings, Superior, CO (US)

(72) Inventor: James Edward Jennings, Superior, CO (US)

(73) Assignee: James Edward Jennings, Superior, CO (US)

( * ) Notice: Subject to any disclaimer, the term of this patent is extended or adjusted under 35 U.S.C. 154(b) by 0 days.

(21) Appl. No.: 13/572,674

(22) Filed: Oct. 6, 2012

(65) Prior Publication Data

US 2014/0100006 A1    Apr. 10, 2014

(51) Int. Cl.
*G06F 17/00* (2006.01)
*A63F 13/00* (2014.01)
*A63B 67/00* (2006.01)

(52) U.S. Cl.
CPC ............ *A63B 67/002* (2013.01); *A63F 13/005* (2013.01)
USPC ........................................................ 473/415

(58) Field of Classification Search
CPC ..................................................... A63B 49/00
USPC ................. 473/415; 463/42; 273/90; 52/80.1
See application file for complete search history.

(56) References Cited

U.S. PATENT DOCUMENTS 4,798,389 A * 1/1989 Long ............................. 473/468
2010/0313490 A1 * 12/2010 Park et al. ...................... 52/80.1

OTHER PUBLICATIONS

InfoSports.com, http://web.archive.org/web/20080304001609/http://infosports.com/baseball/arch/571.htm, Date Created Mar. 8, 2008.*
Sony Miami Open, https://www.youtube.com/watch?v=WzXhAePrFUA, Created Dec. 12, 2009.*

* cited by examiner

*Primary Examiner* — Reginald Renwick (57) ABSTRACT

An Arena Baseball Game system and method for playing an electronic interactive spectator participation game incorporating many aspects of Rounders, Knickerbocker rules and Negro League baseball innovation "Night Baseball." The method of play is disclosed, involving some of the same rules as American baseball with virtual interplay. Time is regulated by a game clock and balls may be deflected back as playable by a rebounding assembly that surrounds the arena field. The Arena method of play includes monitored base force out zones and means for ball game conclusion by predetermined "aces" or "runs" and time duration. The arena has a playing area surrounded by a wall structure such as pad and or panel walls and spectator protective vision enabled side covering. A baseball-like game played within an enclosed facility, wherein the game method of play rules and facility are designed for fast paced action.

3 Claims, 8 Drawing Sheets

ARENA BASEBALL GAME SYSTEM

CROSS REFERENCE TO RELATED APPLICATIONS

This Application is a Continuation in part of Design application Ser. No. 29/348,584, filed Jan. 21, 2010; and is a Continuation of application Ser. No. 13/036,557, filed Feb. 28, 2011; which is a Continuation of application Ser. No. 12/218,170, filed Jul. 11, 2008; which is a Continuation of application Ser. No. 11/820,475, filed Jun. 19, 2007, now abandoned.

BACKGROUND OF THE INVENTION

1. Field of the Invention

This Arena Baseball Game invention pertains to games and more particularly to a scaled down and simplified electronic managed, operated, umpired baseball game system. The electronic interactive and human player game version for indoor and outdoor playing, but dominantly designed for our innovative facility. The invention relates to an apparatus and method for playing a new Simulcast cross platform game incorporating spectator interaction with many aspects of Rounders, Knickerbocker and Negro league "Night" baseball innovation.

2. Description of the Related Art

As America's favorite "You make the Call" spectator sport, the game of baseball has remained essentially unchanged over the years, excepting some minor changes in rules and player equipment. Our invention breaks prior barriers and eclipses early efforts of fan interaction by stimulating multiple senses simultaneously.

Traditional baseball or softball facilities and rules simply do not lend to a game that is fast paced wherein a full game can be played in a relatively short length of time. In today's fast paced society, a baseball-like game that could provide an exciting rate of play, with a game clock, in approximately two-hours, would fit well into busy schedules.

In addition, Foster's U.S. Pat. No. 4,911,443 details an Arena Football game played on smaller dimension football field, Henderson creates baseball games of chance U.S. Pat. No. 2,886,319, Byrd designated a zone area U.S. Pat. No. 5,882,271, Cavallaro U.S. Pat. No. 7,341,530 system adds a graphical image of the strike zone to a video or other image of a baseball game and Benjamin eliminates the need for a home plate Umpire U.S. Pat. No. 6,634,967. Inselberg U.S. Pat. No. 6,650,903 suggests marketing through interactive devices, while Spanton U.S. Pat. No. 7,632,186 devised a spectator mode for a video game. Where Fleming U.S. Pat. No. 7,752,633 and Edberlein U.S. Pat. No. 7,092,730 contribute elements of simulcast and cross platform respectively. Gulick U.S. Pat. No. 5,228,697 describes a phosphorous golf ball which emits a glow of light, Digman U.S. Pat. No. 6,280,654 produces a Glow in the Dark rosin bag, and Kelly U.S. Pat. No. 5,401,018 of Tronco Corp. presents a simulated arcade baseball game where speed over time is measured velocity.

In this embodiment, a Web site is established on the WWW by the game operator via an ISP (Internet Service Provider) using HTML, XML or any other suitable programming language. The web site home page is an inquiry electronic form page to register to play the game and a simulated playing field on the video monitor. The procedures for the use, navigation, input of data and interaction with the web site are well known in the industry such as point-and-click on hyperlinks with a computer mouse computer input device, filling in electronic forms, sending/receiving email, speaking to the web site and listening to the web site via Voice over Internet Protocol (VoIP) The players may communicate in question and answer format via a voice synthesizer connected to a processor. The web page input data is evaluated by the game operator. The input data may be stored in computer memory, statistics kept, virtual teams formed with other online players, etc. in a like manner of the current virtual games available on the Internet today, well know in the art.

The invention may be practiced with a computer system in communication (either wired or wireless) with at least one other computer or at least one remote input device further comprising sufficient hardware, software, accessories and peripheral devices or such gaming computer consoles interacting with other optional entities' data to generate input/output via cell phone, smart phone and/or email or other smart device. A smart device is hereby defined as a cell phone integrated with a computer or a computer integrated with a cell phone.

SUMMARY OF THE INVENTION

The present invention relates to an electronic managed, umpired, and operated indoor sporting game and more particularly to an interactive indoor baseball game. Baseball is a well known ball game that is played according to well established and new innovative base zone rules. It is desirable that baseball is played indoors such that the vagaries of the weather do not intervene. This invention may conversely be termed a human video game.

The present invention is a baseball-like game played within a multiple side enclosed facility, retractable roof stadium, or open air facility, wherein the game rules and facility are designed for fast paced action. The inventive baseball-like game method of play is designed to be played in a time span of approximately one hour. Accordingly, the following objects and advantages are to be achieved by the inventive baseball-like game method and facility: An object of the invention is to have a baseball-like game which can be played in less than two hours which thereby employs a clock for regulation. It is another object of the invention to provide a game that can be safely played with spectators seated in close proximity to the playing field as a Roman Coliseum Pit and with alternate as Glow in "Night Baseball." It is still another object of the invention to provide sufficient precautions to protect the players from indoor hazards resulting from a relatively small playing field, yet not mitigate the hard-nosed and fast-paced action of traditional American baseball with an electronic monitored base umpired force zone.

DETAILED DESCRIPTION OF THE PREFERRED EMBODIMENTS

Figure 1:
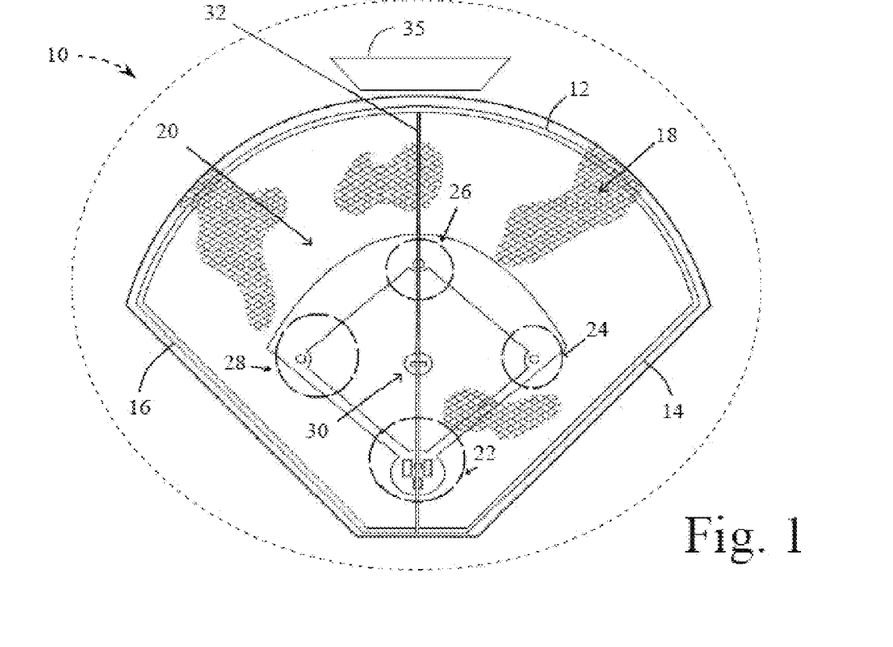
FIG. 1 is a top plan view of the playing arena of a first preferred embodiment of the present invention.

Reference is made first to FIG. 1 which is a top plan view of the playing arena of the first preferred embodiment of the present invention. FIG. 1 discloses playing arena 10 as comprising a generally circular or elliptical enclosure surrounding a playing field 20 and, in the preferred embodiment, providing adequate seating for an array of fans surrounding playing field 20. In the preferred embodiment of the present invention it is anticipated that the fan audience seating arrangement for the Arena Baseball game will be generally smaller than that of existing Major League Baseball (MLB) fields. One object of the present invention is to create more of an audience participatory environment for the fans attending the baseball game. Towards such end, the enclosure defining playing arena 10 should be smaller than a typical open air baseball stadium, but somewhat larger than the typical closed basketball arena.

Further disclosed in FIG. 1 (in this top plan view) are outfield enclosure 12, first base side enclosure 14, and third base side enclosure 16. The specific structure of each of these enclosures is described in more detail below. Overarching the entire playing field 20 is retractable netting 18. Retractable netting 18 is supported in this first preferred embodiment by a mid-field ceiling support 32 comprising an arching semi-rigid support component extending from behind home plate to the outfield enclosure 12 in the vicinity of center field.

Associated with what is the equivalent of the infield in the standard American Baseball field configuration are the usual home plate, first base, second base, and third base. Defined in FIG. 1 and utilized as part of the method of play for the Arena Baseball game, are home slide zone 22, first base slide zone 24, second base slide zone 26, and third base slide zone 28. Positioned in the center of the infield area is pitcher's mound 30.

Also positioned in the center field area, above outfield enclosure 12, is scoreboard display (replay screen) 35. This structural component is important for audience participation in a number of the preferred embodiments of the game method of play of the present invention. Overall, the components of the Arena Baseball game structure of the present invention, shown generally as the playing arena 10 of FIG. 1, are structured to be similar to standard American Baseball, but fully enclose the playing area so as to allow the audience to position themselves very close to the activity within the playing area. The various surrounding enclosures and retractable netting components allow for the continuous play of the Arena Baseball game, according to the various rules described in more detail below, especially those relating to the play of balls off of the walls and ceiling enclosure components.

Figure 2:
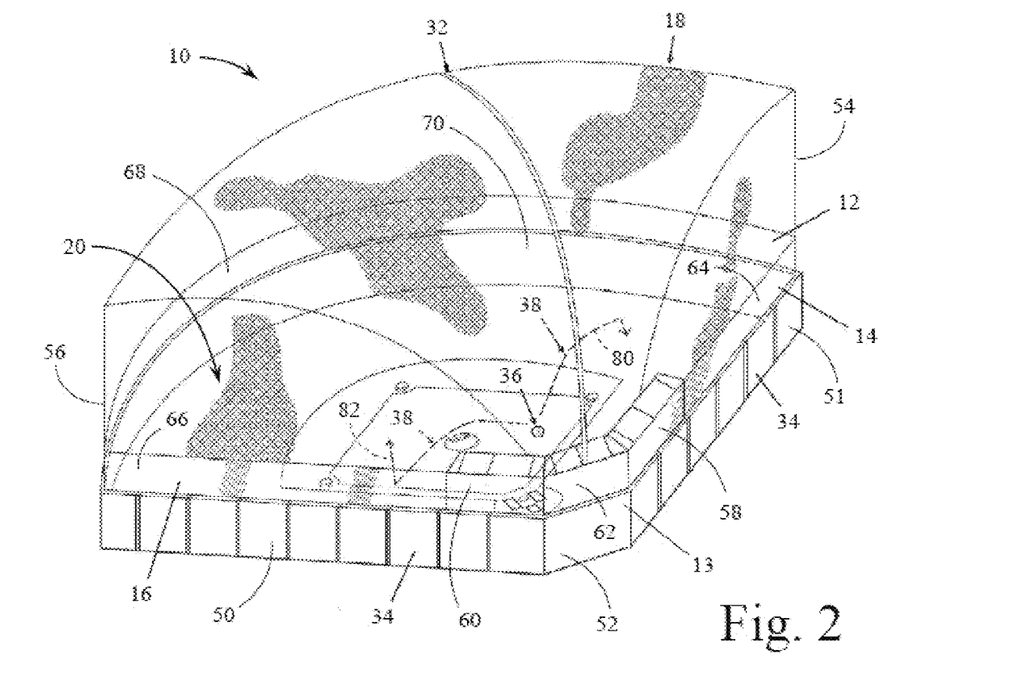
FIG. 2 is a perspective view of the playing arena of the first preferred embodiment of the present invention.

Reference is next made to FIG. 2 which is a perspective view of the playing arena of the first preferred embodiment of the present invention as shown from the top in FIG. 1. In this view of FIG. 2, playing arena 10 is again shown to be framed by outfield enclosure 12 and home plate backstop enclosure 13. Likewise, first base side enclosure 14 and third base side enclosure 16 are disclosed with their elevational configuration. Retractable netting 18 is shown to comprise an array of net panels forming the upper sections of the sidewalls and the arching sections of the ceiling for the overall enclosure.

Playing field 20 is again shown to comprise a layout generally consistent with a standard American baseball field. Mid-field ceiling support 32 is shown to extend in a manner that provides a central support to retractable netting 18. The various surrounding enclosures seen from above in FIG. 1 are now disclosed in FIG. 2 as being comprised of multiple components. Positioned on the ground level for each of these enclosures are a number of padded wall sections 34. The structure of these lower wall portions is similar to the wall panels associated with hockey arenas, typically referred to as "banger boards". At the base of each wall portion are the padded wall sections 34 over which are positioned various transparent wall components. Third base side banger board wall 50 is shown extending from an area generally adjacent home plate out to left field corner support 56. In a similar manner, first base side banger board wall 51 extends from an area adjacent home plate to right field corner support 54. Home plate backstop banger board wall 52 is positioned in the area immediately behind home plate and connects the third base and first base side banger board walls 50 & 51.

As indicated above, positioned on top of the padded wall sections 34, for all of the enclosures around playing field 20, are transparent panels that allow the audience to safely view the action during the Arena Baseball game. Right side transparent backstop 58 is positioned above and to the right of the home plate area. Left side transparent backstop 60 is positioned above and to the left of the home plate area. Center transparent backstop 62 is positioned directly over home plate backstop banger board wall 52. In a similar manner, right field transparent mid-wall 64 is positioned on top of the various padded wall sections 34 that make up first base side banger board wall 51. Left field transparent mid-wall 66 likewise sits atop the padded wall sections 34 positioned within third base side banger board wall 50. Outfield transparent mid-wall 68, in a similar manner, sits atop padded wall sections 34 that make up outfield banger board wall 70.

Also shown in FIG. 2 are examples of ball action that might occur during the game method of play of the Arena Baseball game. As indicated above, one object of the present invention is to allow the audience to safely view the activity during the Arena Baseball game, while the rebound rule components of the game are carried out. The fully enclosed playing field 20 is intended to permit the use of rebound rules in the game method of play as described in detail below. Two examples of this are shown in FIG. 2 where baseball (or softball) 36 is directed from a position near home plate in any of a number of different directions within the enclosed playing field. These motion (rebound) ball paths 38 in one instance result in ball path 80 wherein the ball is reflected off of the ceiling netting component. In a second instance, the ball moves in ball path 82 wherein the ball is reflected off of the third base side enclosure. Each of these ball paths may result in an "in play" ball according to the rules of the Arena Baseball game, again as described in more detail below.

Figure 3:
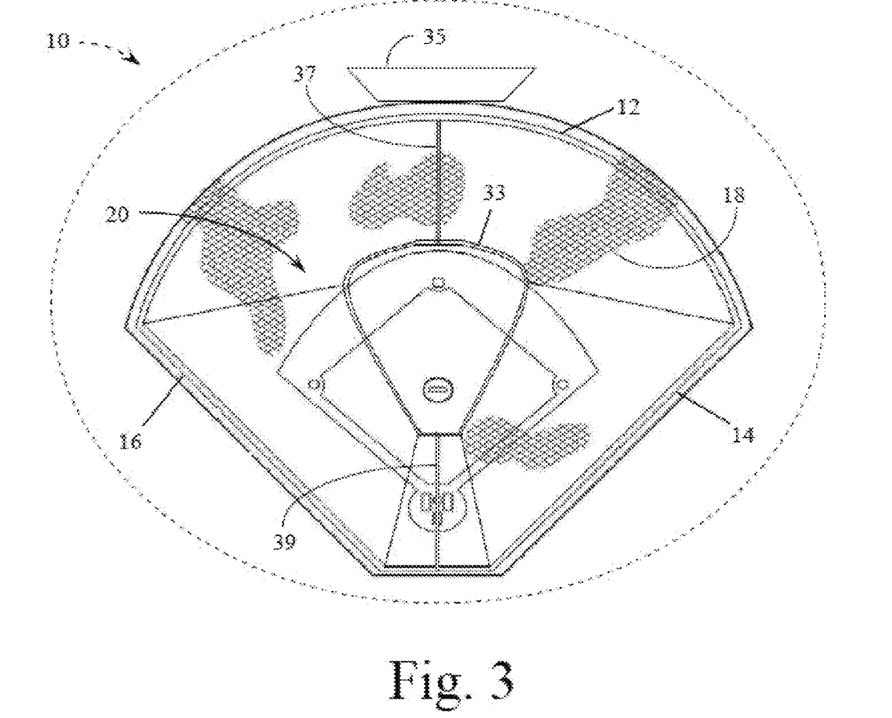
FIG. 3 is a top plan view of the playing arena of a second preferred embodiment of the present invention defined by a ceiling attachment ring for the retractable netting.

Reference is next made to FIG. 3 which is a top plan view of the playing arena of a second preferred embodiment of the present invention, in this case defined by a ceiling attachment ring for the retractable netting. Playing arena 10, as shown in FIG. 3, once again comprises a generally circular or elliptical enclosure surrounding playing field 20 and again in this embodiment provides adequate seating for an array of fans surrounding playing field 20. Also disclosed in the top plan view of FIG. 3 are outfield enclosure 12, first base side enclosure 14, and third base enclosure side 16. The specific structures of each of these enclosures are as described above in conjunction with FIG. 2.

In the second preferred embodiment shown in FIG. 3, however, retractable netting 18 extends over playing field 20 and is supported by a combination of support structures, including mid-field ceiling attachment ring 33, outfield ceiling ring support 37, and infield ceiling ring support 39. This ceiling attachment ring 33 and the ceiling ring supports 37 & 39 each comprise semi-rigid support components that extend from the enclosure walls and support the flexible retractable netting 18. The balance of the components of the embodiment shown in FIG. 3, including scoreboard display (replay screen) 35, are similar to those same components described above in conjunction with FIGS. 1 & 2.

Figure 4:
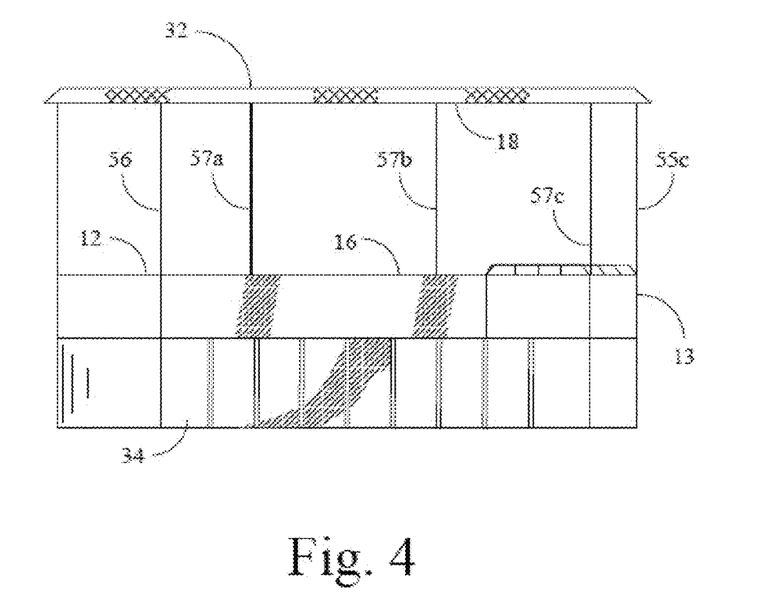
FIG. 4 is a side elevational view of the playing field enclosure of a first preferred embodiment of the present invention.

Reference is next made to FIG. 4 which is a side elevational view of the playing field enclosure of either of the first or second preferred embodiments of the present invention. The view in FIG. 4 provides a profile view of the structure as it may be seen by individuals in the fan audience seating arranged along the third base side of the playing arena. In the view of FIG. 4, a portion of outfield enclosure 12 is disclosed, as is all of third base side enclosure 16. Positioned behind the home plate area is home plate backstop enclosure 13. Disclosed as part of third base side enclosure 16 are padded wall sections 34 similar to those described above in conjunction with FIG. 2.

Also shown in FIG. 4 is one possible arrangement for the ceiling structure that provides the necessary support for retractable netting 18 that forms the interior ceiling above the playing field. Mid-field ceiling support 32 is shown to be a semi-rigid component that extends across the entire playing field from behind home plate to a center point in the outfield. Various other support structures connect the enclosure walls 12, 13, & 16 in this view, with midfield ceiling support 32. These include rigid left field corner support 56 and a number of third base side ceiling cables 57a-57c. Also shown in the view of FIG. 4 is one of the first base side ceiling cables 55a-55c.

The structures shown and described in FIG. 4 are intended to be general representations of the enclosure wall, ceiling support structures, and ceiling retractable netting. Variations on these support structures, including posts and cables, are anticipated. The basic concepts, however, are to provide a lower padded wall section forming the base of the playing field enclosure, which supports a transparent or partially transparent section similar to the "banger board" components described above. On top of the banger board components are a variety of poles and cables that extend to the ceiling and support a semi-rigid ceiling support configured either in a single section extending from behind home plate to the outfield, or in the ceiling ring structure shown in FIG. 3.

The above described components together serve to fully enclose the playing field to allow the assembled fan audience to enjoy the arena baseball game in close proximity to the players while limiting the danger of being hit by a ball during the play of the game. Likewise, as indicated above, the enclosure provides the necessary rebound walls and ceiling components that allow certain rules of the arena baseball game to be implemented for the enjoyment of the fan audience.

Figure 5:
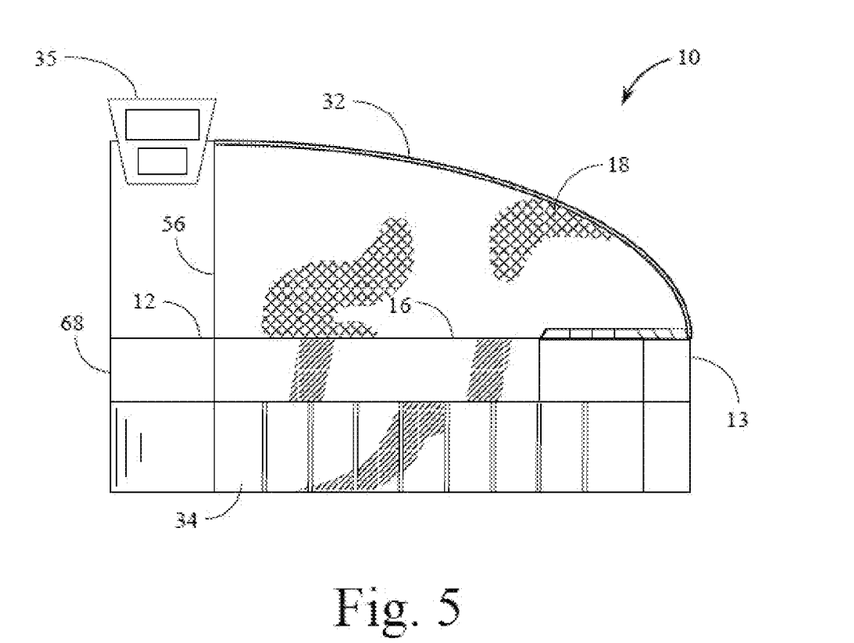
FIG. 5 is a side elevational view of the playing field enclosure of an alternate structure for the first preferred embodiment of the present invention.

Reference is next made to FIG. 5 which is a side elevational view of an alternate structure of the playing field enclosure of the first preferred embodiment of the present invention. The view in FIG. 5 provides a profile view of the structure as it may be seen by individuals in the fan audience seating arranged along the third base side of the playing arena. In the view of FIG. 5, a portion of outfield enclosure 12 is disclosed, as is all of third base side enclosure 16. Positioned behind the home plate area is home plate backstop enclosure 13. Disclosed as part of third base side enclosure 16 are padded wall sections 34 similar to those described above in conjunction with FIGS. 2 & 4.

Also shown in FIG. 5 is an alternate arrangement for the ceiling structure that provides the necessary support for retractable netting 18 that forms the interior ceiling above the playing field. Mid-field ceiling support 32 is shown in this embodiment to be a semi-rigid arching component that extends across the entire playing field from behind home plate to a center point in the outfield. Various other support structures connect the enclosure walls 12, 13, & 16 in this view, with midfield ceiling support 32 or the edges of retractable netting 18. These include right field ceiling support 56 as well as a number of ceiling cables (not shown). Outfield transparent mid-wall 68 is shown to extend generally around the outfield and, at the outermost point in the outfield, is shown to provide base support for scoreboard display (replay screen) 35.

As with the embodiment shown in FIG. 4, the structures shown and described in FIG. 5 are intended to be general representations of the enclosure wall, ceiling support structures, and ceiling retractable netting. Variations on these support structures, including posts and cables, are anticipated. The basic concepts, however, are again the same as shown and described with regard to FIG. 4 and are to provide a lower padded wall section forming the base of the playing field enclosure, supporting a transparent or partially transparent section of "banger board" components, which in turn support a variety of poles and cables that extend to the ceiling and support or suspend the semi-rigid arching ceiling component as described above.

Figure 6:
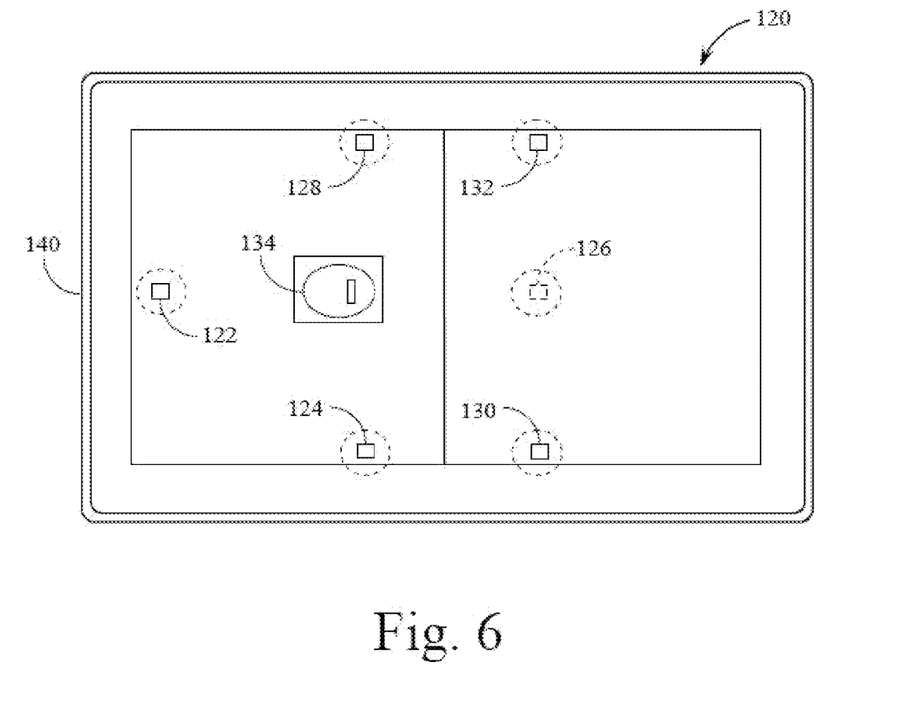
FIG. 6 is a top plan view of the playing field of a third preferred embodiment of the present invention with portable mound.

Reference is next made to FIG. 6 which is a top plan view of a playing field of a third preferred embodiment of the present invention disclosing alternate base arrangements and a portable pitcher's mound. The playing field 120 shown in FIG. 6 is intended for use with one embodiment of the game method of play of the present invention and may have a total length of approximately 200 feet (60.96 meters) and a total width of approximately 85 feet (25.91 meters). The game method of play associated with the field in FIG. 6 may be implemented in an indoor facility such as a hockey rink of regulation size defined by the National Hockey League (i.e., 200 feet by 85 feet). In this embodiment, with playing field 120 typically located inside a standard sized hockey arena or football stadium, the field is preferably circumscribed by a padded wall section 140 separating the field from the surrounding spectator areas. The playing field 120 is preferably covered by a rectangular section of synthetic turf or padding similar to that found in most stadiums used for traditional American football or soccer, or by hardwood flooring as is typically found in gymnasiums.

As described in more detail below, defensive players in the game method of play implemented in the arrangement shown in FIG. 6, may force out a runner within a predetermined distance from base upon approaching an offensive player engaging the respective slide zone areas about the bases by contacting the base while in control of the ball, prior to the offensive player contacting the base. As shown in FIG. 6, the rectangular playing surface may employ two separate home bases 122 & 128, one for batting and the other for scoring "aces" (see method of play detail below). In addition, pitcher's mound 134 shown in FIG. 6 is preferably portable and moveable about the playing field for variations in the configuration of the field.

The structure of the playing field shown in FIG. 6 provides two alternate embodiments that derive from the alternate placement of the two home bases 122 & 128 described above. In the first embodiment, a traditional home base is positioned at base 122 followed by traditional first base 124, traditional second base 126, and traditional third base 128. In an alternate embodiment according to an alternate game method of play, first base 124 may be followed by second base 130, third base 132, and then the alternate (second) home base 128. Once again, the manner of using the alternate arrangement of bases is described in more detail below. The field configuration shown in FIG. 6 will preferably have elements that allow the attachment of the various bases in each of the alternate positions around the playing field depending upon the game method of play to be implemented.

Figure 7:
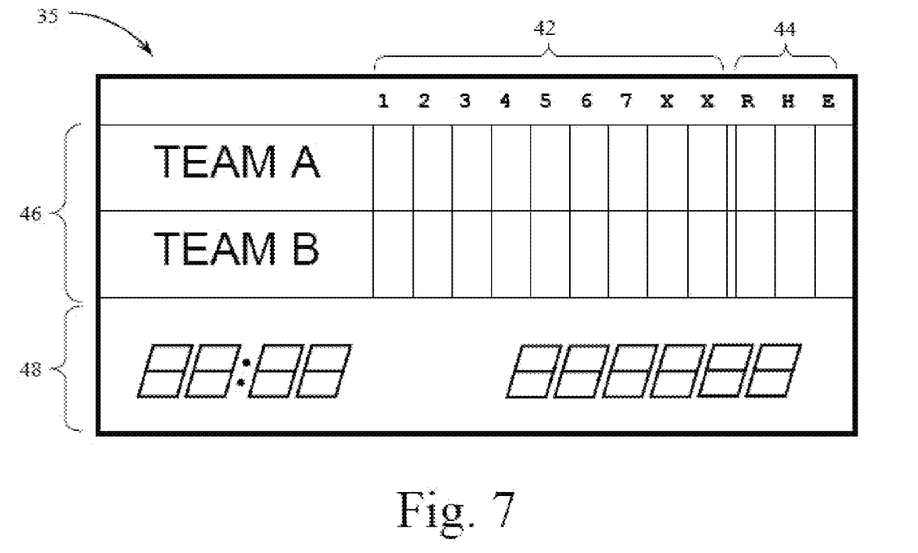
FIG. 7 is an elevational view of a scoring board showing the statistical summary of a game for use in conjunction with the game method of play of the present invention.
Figure 8:
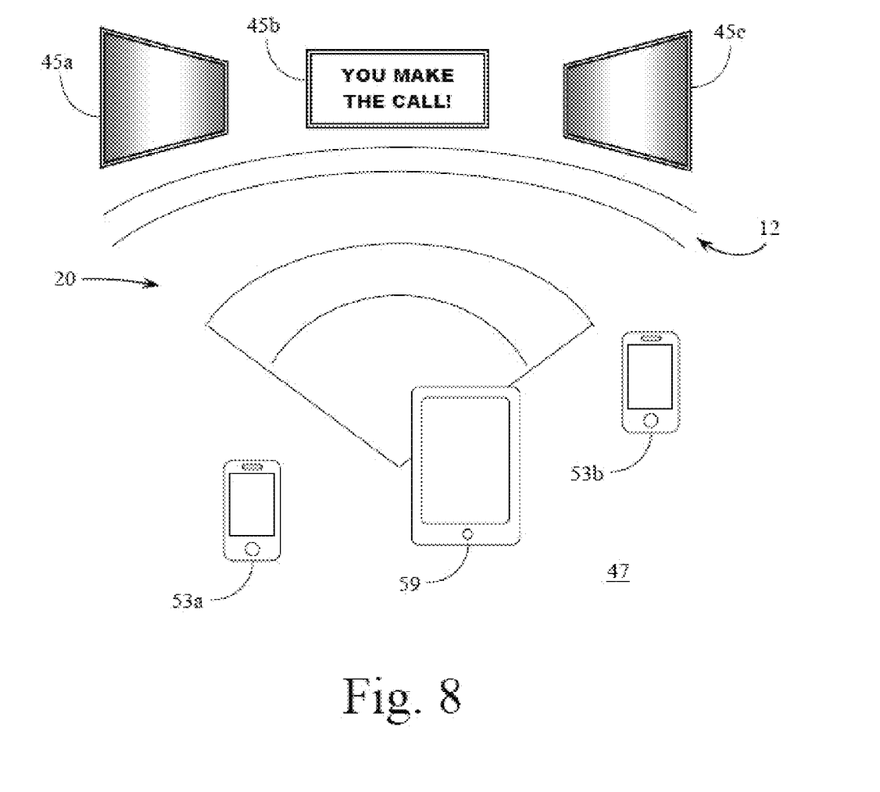
FIG. 8 is a partially schematic perspective view of the field of play from a spectator's viewpoint disclosing systems for fan interaction elements of the game method of play of the present invention.

Reference is next made to FIGS. 7 & 8 which provide a description of the systems utilized in conjunction with the various fan interactive elements of the game method of play of the present invention. FIG. 7 is an elevational view of a typical scoring board component showing the statistical summary of a game for use in conjunction with the game method of play of the present invention. The scoreboard of FIG. 7 is similar in many respects to a standard baseball scoreboard. Score display 35 includes two rows 46 for presentation of team information indicia. Within rows 46 are game inning score columns 42, which in the preferred embodiment are numbered 1-7 with the two extra inning columns indicated with the letter "X". Also within rows 46 are box score columns 44 which include a summary of the runs, hits, and errors for each of the two teams, as is typical in a baseball scoring display.

Also included in scoring board display 35 shown in FIG. 7 is an area 48 on the display for a game clock and other indicia. In an electronic scoreboard configuration, these components will be provided by standard lighted and numerical displays in a size large enough to be viewed and read across distances typically associated with the playing field area. As the display board 35 is typically positioned across the playing field area from the spectators who are intended to utilize the display, the display components would typically need to be many feet in height in order to be read and understood by the spectators. Such configurations are typical in fields of play associated with standard American baseball rules and are modified herein to accommodate the game method of play of the present invention, including the rule differences associated with the number of innings and the time duration of the game.

FIG. 8 provides a partially schematic perspective view of the field of play from a spectator's viewpoint, disclosing various systems for the fan interactive elements of the game method of play of the present invention. In this view, generally taken from the view of interactive spectators 47, fans in the audience may participate in the interactive elements of the game method of play as they are presented on the various display panels comprising the overall arena baseball environment. In FIG. 8, representative display elements are shown comprising a left field interactive display 45a, a center field interactive display 45b, and a right field interactive display 45c. Each of these displays may preferably be positioned above the outfield enclosure and, for purposes of the play of the game, would form a part of the outfield enclosure. In other words, any action during the game method of play involving the play of balls off of the outfield walls would equally apply to the surfaces of the interactive display systems. Coverings for these display panels would therefore be required in order to allow the repetitive impact of the ball against the panels during the play of the game.

As indicated above, outfield interactive displays 45a-45c are generally positioned across the playing field 20 from interactive spectators 47. In the game method of play of the present invention, spectators 47 are anticipated to have and interact with any of a number of different smart devices comprising smart phones, tablet PCs, or even laptop PCs. Examples of these devices are shown in FIG. 8 as wireless smart phones (cellular network) 53a & 53b, as well as wireless tablet PC (wi-fi network) 59. The manner in which each of these spectators interact with these devices to participate in the game method of play of the present invention is described in more detail below.

FIG. 8 provides one example of indicia displayed on centerfield interactive display 45b, wherein the interactive spectators 47 may participate in the "You Make the Call" element of the game method of play of the present invention. Further interactive elements of the game are anticipated and described in more detail below, but generally comprise a process of displaying prompts on the various outfield displays 45a-45c which initiate actions by spectators 47 on the various electronic data communication devices to respond by selecting choices, options, or inputting brief text information. In this manner, the spectators associated with the game method of play are provided with a more fully interactive participation in the activities of the teams on the playing field involved in the arena baseball game.

Figure 9:
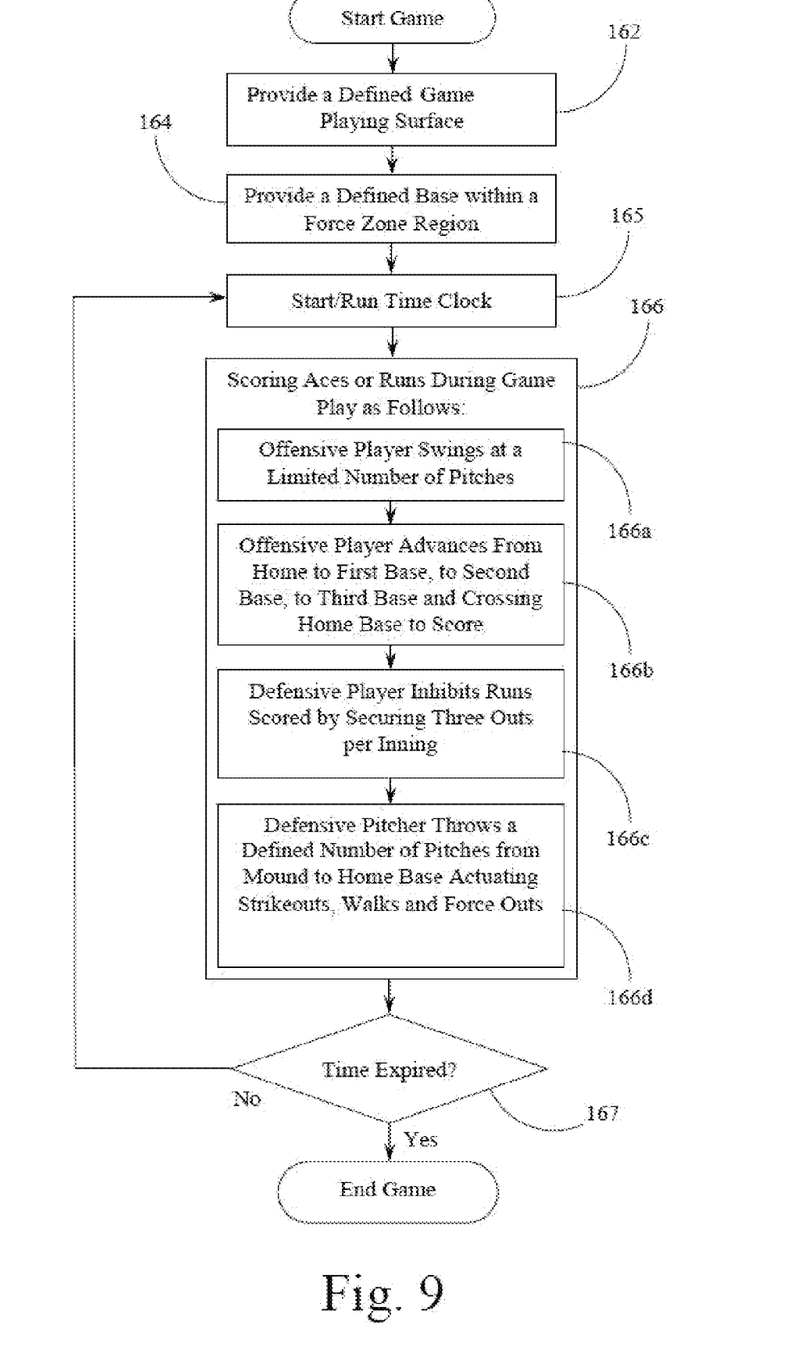
FIG. 9 is a flowchart diagram showing a high level sequence of steps associated with the game method of play of the present invention.

FIG. 9 is a flowchart diagram showing a high level sequence of steps associated with the game method of play of the present invention. One goal of the time managed start/run clock 165 game method of play of the present invention is to provide the pitcher with an opportunity to maintain endurance throughout the shortened length contest on a defined provide playing surface 162 with a provide base & force zone 164 by delivering quality pitches, and limiting the number of pitch attempts 166d to each offensive batter with limited number of swings 166a. The object of the competition is to advance offensive players by sequential base advancement 166b from base to base and where defensive players inhibit scoring by obtaining three outs per inning 166c advancement while accumulating outs 166d and progress score aces or runs 166. This is reflected by a game rule wherein there is a seven pitch limit per each at bat and a query time expiration 167 for the game. A defensive player limitation promotes aerobic activity employing a positions range and a greater area to cover defensively. The ball utilized provides greater bounce and requires higher concentration to field and/or defend. The pitcher's mound projects the pitcher as the center of action and creates a downward plane of projection towards the batter. A designated fielder player is allowed to field defensively at least one out per inning.

The structures described in the previous section above are intended to facilitate spectator participation and provide protection for players by utilizing a lower absorbing pad wall surface and dead ball location created by impact absorption. The suspended flexible elastic net enclosure creates a means for rebounding a live ball and keeping the ball in play, while simultaneously protecting the spectators from harm by use of the transparent backstops. The structures described are versatile with retractable netting walls allowing glove wearing fan participation.

The typical ball game of the present invention is preferably played using the above structures according to a predetermined set of rules. These rules will preferably provide for the game to be played between two opposing teams of players. The aim of each team will be to obtain a better score than the other team and thereby win the game. In this regard, the teams preferably take turns at bat (the batting team), and at pitching and fielding the ball (the pitching team). Preferably, the rules will designate the team having the higher point tally at the end of the game as the winner. Should the higher point total not determine the winner, then two extra innings are provided for overtime play, with a further tie break determination being made by totaling runs plus hits minus errors to identify the winning team.

Figure 11:
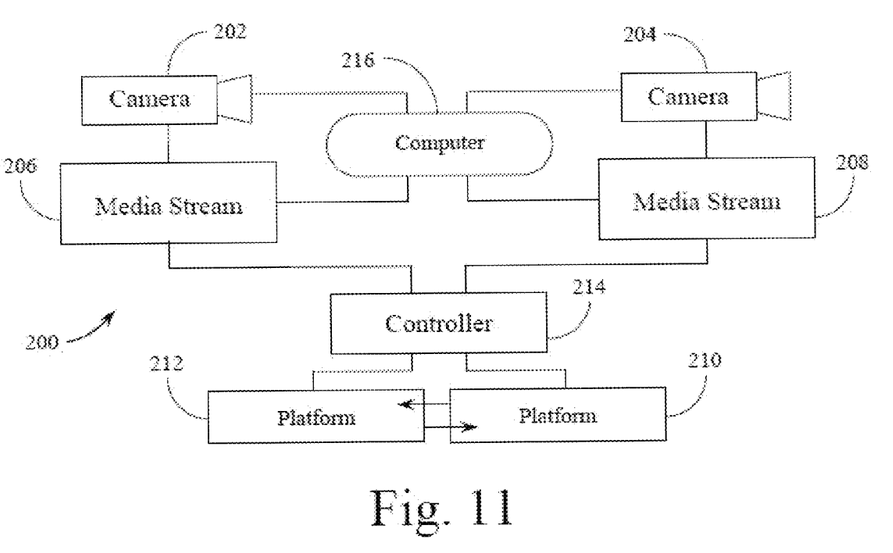
FIG. 11 is a schematic block diagram of a game action and game information collection (multimedia based) implementation of a system for communicating live game play to local and remote audience game play involvement for use in conjunction with the game method of play of the present invention.

FIG. 11 is a schematic block diagram of a game action and game information collection (multimedia based) implementation of a system for communicating live game play to local and remote audience game play involvement for use in conjunction with the game method of play of the present invention. The inventive game played within the inventive facility of the present invention comprises a Game Play Broadcast System 200, Field Camera (one of multiple) 202, Field Camera (two of multiple) 204, Local Media Stream Instrumentation (one of multiple) 206, Local Media Stream Instrumentation (two of multiple) 208, Network Access Platform A 210, Network Access Platform B 212, Network Broadcast Controller 214, Media Streaming Control Computer 216, cross platform multiplayer game forum complemented by telecommunication and graphics.

Figure 12:
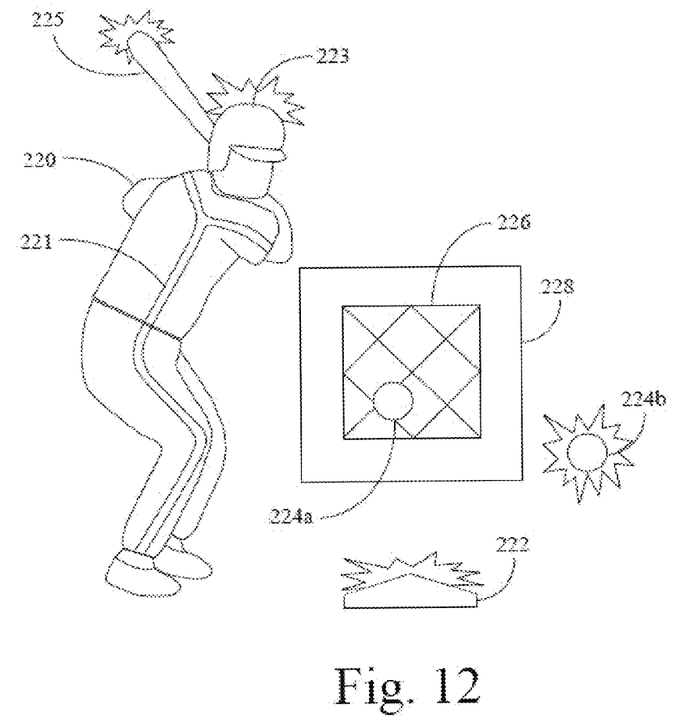
FIG. 12 is a partially schematic elevational view of the game play visual (tracking) accentuation elements of the system of the present invention for facilitating the accurate game action and game information collection function.

Wherein, FIG. 12 is a partially schematic elevational view of the game play visual (tracking) accentuation elements of the system of the present invention for facilitating the accurate game action and game information collection function. FIG. 12 illustrates mode of play and action: Live Player (Batter) 220; Live Player Accentuation Elements 221; Base (Playing Surface) Accentuation Elements 222; Player Helmet Accentuation Elements 223, Ball (within Strike Zone Detection) 224*a*; Ball (outside Strike Zone Detection) Accentuation Elements 224*b*; Bat Accentuation Elements 225; Strike Zone Detection Grid 226; and Strike Zone Visual Detection Area 228 as the focal point of the competition.

If a certain rule is not specifically addressed below, then standard American baseball or softball rules can be assumed to apply:

Equipment—The bat 225 used in the game method of the present invention is of regulation baseball 224*a*, 224*b* dimensions. The ball used may be a urethane core safety baseball or softball. The wearing of uniforms 221 by the players 220 is optional but preferred. The use of leather mitts or Jai alai equipment, catcher's face mask, and protective helmets 223 are preferred to enhance the safety of the game method of play. Bases 222 are provided on field of play.

Participants—A team is comprised of a number of players 220 in the preferred embodiment. Accordingly, there is a management need for a system that provides both a quantitative and a qualitative way of evaluating a baseball player 220. Furthermore, in today's sports environment, where most people watch baseball games in televised programs, a real time player performance evaluation and prediction during the video streaming of the game is very desirable. In an effort to better understand a player's contribution to a teams' result, statisticians developed Sabermetrics to help evaluate baseball players 220. Their goal was to measure the contributions of players to the games won and lost. Here, Sabermetrics is used to evaluate the past performance of a player and help predict the future performance. To do so the statistics must satisfy three questions. Almost every statistic has flaws and the best statistics are the ones with the only minor failings and the least amount of flaws. First, "Does the statistic measure an important contribution to the goal?" The goal for all teams regardless of the sport is winning games. In baseball the pitcher's ERA, earned run average, measures the number of runs a pitcher allowed, thus showing a pitcher's contribution to the outcome.

Duration—A game preferably comprises seven innings and seven pitches per batter. This duration and the pitch number limit provide a very fast action game which can be completed in a short period of time. The duration of the game may be divided into increments of time displayed by the game clock. Increments of time such as a whole, halves and/or quarters with overtime periods, and within these time increments, rounds or turns at bat.

Figure 13:
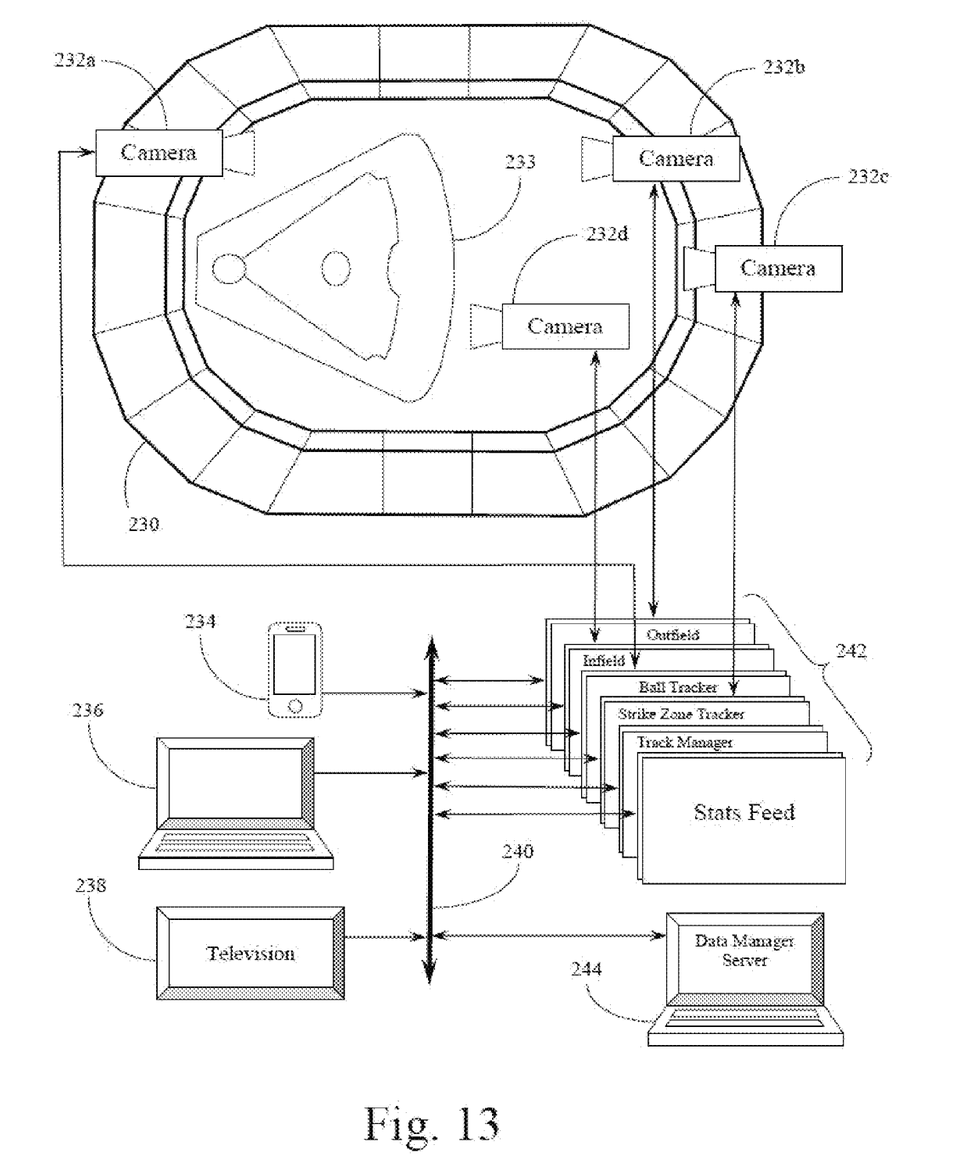
FIG. 13 is a partially schematic diagram of a game action and game information collection (multimedia based) implementation of a system for communicating live game play and live action game statistics to local and remote audience game play involvement for use in conjunction with the game method of play of the present invention.

Communication—In one embodiment, a large screen display 30, as depicted in FIG. 13, remotely located from the fan (e.g., a JUMBOTRON® display) is used for querying users of the interactive device. A user interface on the device allows an audience member to enter a response to queries. The interface device is also supplied to manager coaches for in game decisions, evaluations and substitution of players. Examples of simple user interfaces are a keypad, selection buttons, touch screen, voice recognition, but any other user interface could be incorporated within the invention.

Scouting—Evaluating individual player performance are based on statistical measures, such as batting average for batters, i.e., the number of hits divided by the number of at bats, and earned run average for pitchers, i.e., approximately the number of runs given up by a pitcher per nine innings. The advent of Sabermetrics has brought a new set of statistics that perhaps better gauge a player's performance and contributions to his team from year to year. Some Sabermetrics measures include on-base plus slugging (OPS), i.e., a somewhat complicated formula that some say gauges a hitter's performance better than batting average, and walks plus hits per inning pitched (or WHIP) that gives a good representation of a pitcher's abilities. However, these statistical measures are based on historical data and very often fail to predict current and future performance of an individual player. Many people believe that the performance of a baseball player depends upon a combination of skill, timing, athleticism, personality, work habits, team chemistry and strategy, among others.

Officials—The game is controlled by at least one umpire in booth or standing behind the catcher. Other umpires, such as base and line umpires, can be included to further officiate the game if desired. Alternatively, a system based on knowing the locations of the strike zone 226 and the ball, can determines whether the pitch 166*a* was a strike or a ball. The sensor cameras 72 for tracking the ball communicate video to Vertical Interval Time Code (VITC) inserts 74. The video from each VITC inserter is sent to a respective tracking computer 76 & 78.

The tracking computers 76 & 78 are connected to each other and to the Strike Zone 226 computer 90 (described below) via a switch 77 (using Ethernet or internet 176, 178). The tracking computer connected to the camera sensor for tracking the strike zone 226 has a graphical user interface 228 (GUI).

FIG. 13 is a partially schematic diagram of a game action and game information collection (multimedia based) implementation of a system for communicating live game play and live action game statistics to local and remote audience game play involvement for use in conjunction with the game method of play of the present invention. This system variation includes, but not limited by Arena Game Environment 230, Field Camera (View of Defense) 232*a*, Field Camera (View of Outfield Play) 232*b*, Field Camera (View of Strike Zone Play) 232*c*, Field Camera (View of Infield Play) 232*d*, Infield Area 233, Remote Smart Device Audience Participant 234, Remote Computer (PC) Device Audience Participant 236, Remote Television Device Audience Participant 238, Network Communications (Internet) 240, Statistics Collection & Broadcast Systems 242, Systems Management Server (Operational Control) 244.

According to an embodiment, system 230 may be used to generate information about and athletic event and its components. System 230 may include a sensor system 242. Sensor system 242 may include one or more sensors to receive information relating to an athletic event on game field 233. This information may include information about objects in the athletic event. These objects can include one or more athletes, game objects, game field objects, etc. In most cases, this information includes video signals or images. This information may also include other information such as sensor position, angle, height, location relative to game field 233, time, or any other information related to the athletic event. Game field 233 may refer to a playing field, natural field, artificial field, court, ice rink or any other athletic playing surface.

According to an embodiment, sensor system 242 may include one or more cameras. In some cases, sensor system 242 may include multiple prosumer, or professional-grade, high definition (HD) cameras 232*a*-232*d* mounted in different locations in an arena/stadium, each covering a portion of the playing surface of game field 233. In a further embodiment, sensor system 242 may include non-visual object sensors. In other cases, sensor system 242 may include wireless sensors, global positioning system (GPS) sensors or radio frequency identification (RFID) sensors. In some cases, sensor system 242 may include a mobile device 234, such as a smart phone or electronic tablet. Sensor system 242 may include any other sensors to record signals and information about an athletic event and to detect, observe or track objects. In another embodiment, sensor system 242 may be configured to record information from the athletic event on game field 233 and transmitted via internet cable/web 240 to consumers smart devices 234, laptops 236 and televisions 238.

Sensor system 242 may be coupled to object tracker, according to an embodiment. Sensor system 242 may provide media signals or object information to object tracker. According to an embodiment, object tracker may be configured to provide an aspect of an object in an athletic event. Aspect information may be provided to data manager 244. According to an embodiment, object tracker may be configured to receive an aspect of an object in an athletic event. Object tracker may also be configured to receive a second aspect of a second object in the athletic event. In another embodiment, object tracker may be configured to receive this information from an external source other than sensor system 242. Such a source may be another database or media stored on a disc, tape, memory or other storage device. In yet another embodiment, sensor system 242 may extract data from recorded media or a recorded broadcast of an event.

In telecommunications by cameras 202,204 and computer 216 networks, multiplexing 200 (also known as muxing) is a method by which multiple analog message signals or digital data streams 206,208 are combined into one controller 214 signal over a shared medium. The aim is to share an expensive resource. Cross platform 210-platform 212 virtualization is a form of computer virtualization that allows software compiled for a specific CPU and operating system to run unmodified on computers with different CPUs and/or operating systems, through a combination of dynamic binary translation and operating system call mapping. In computing, cross-platform 200, or multi-platform 200, is an attribute conferred to computer software or computing methods and concepts that are implemented and inter-operate on multiple computer platforms.

Ground Rules of Play—The following provide rules associated with various actions and batting results during the game method of play. Ball hitting any portion of a fence or a screen and/or the area in back of home plate is in play. Pitched ball going into a camera booth behind home plate, batter advances one base. Thrown (passed) ball, batter advances two bases. Ball hitting padding and bouncing over, batter advances two bases. A fairly batted or thrown ball lodging in the padding, runner advances two bases. A fairly batted or thrown ball that goes into the dugout or strikes equipment on the dugout steps is considered in the dugout and out of play. Ball hitting padding on outfield fence or banger boards to foul or seating side of foul is considered in fair territory. Ball hitting roof or speakers, scoreboard, replay screens is considered in fair territory. If caught by fielder, batter is out and runners advance at their own risk. Ball hitting roof or speakers, scoreboard, replay screens is considered in fair territory and shall be judged fair or foul in relation to where it hits the ground or is touched by a fielder. Ball hitting speakers, scoreboard, replay screens or roof in foul territory is a foul ball. If, however, the ball is caught by a fielder, the batter is out and base runners advance at their own risk. Ball hitting speakers, scoreboard, replay screens in foul territory and ricochets off backstop into fair territory is still a foul ball. If the ball is caught by a fielder, the batter is out and base runners advance at their own risk.

Alternate Preferred Embodiments

Figure 10:
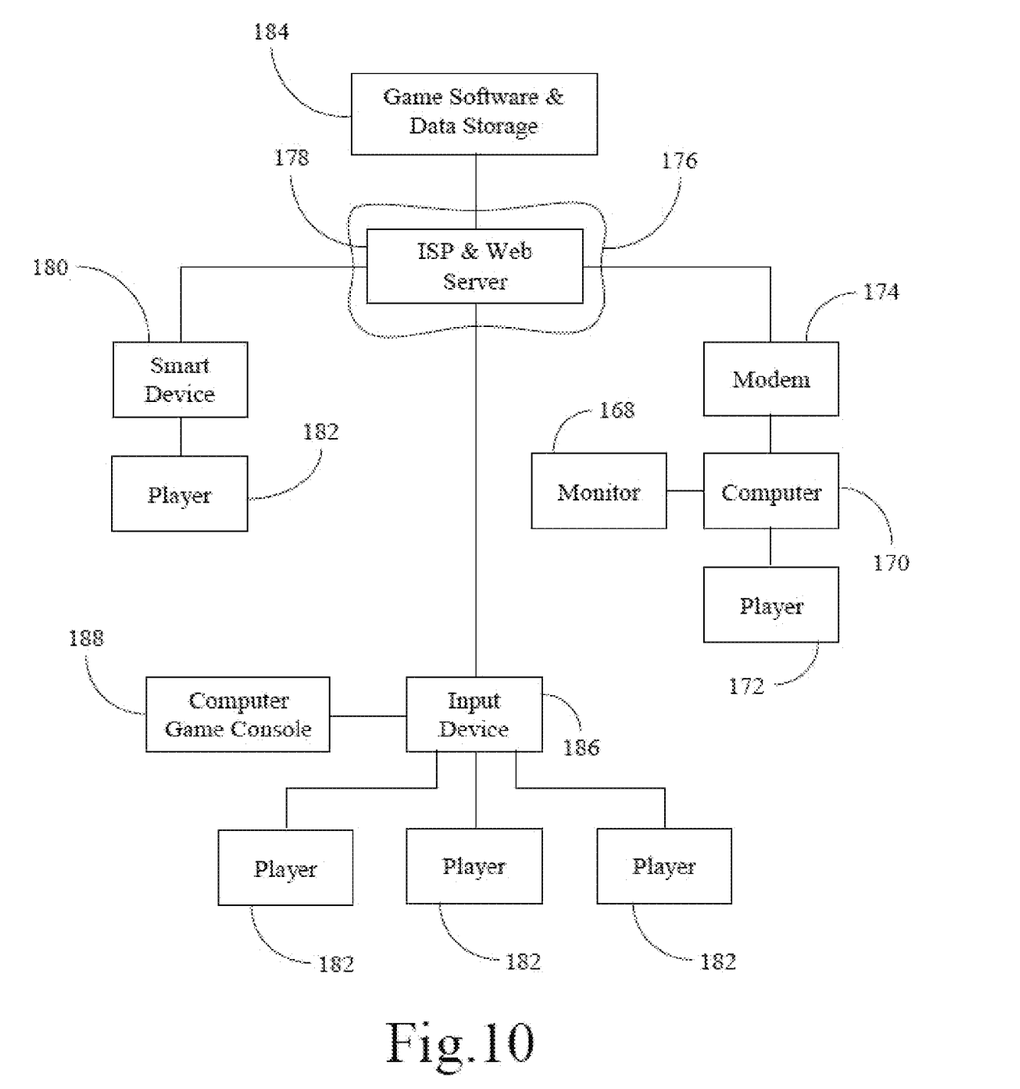
FIG. 10 is a schematic block diagram of an electronic (computer network based) implementation of a system for ancillary implementation of the game method of play of the present invention.

FIG. 10 is a schematic block diagram of an electronic (computer network based) implementation of a system for ancillary implementation of the game method of play of the present invention. The invention may be practiced with a client computer monitor/display 168 and client computer system 170 (server), 172 Client Remote Game Player 172, Client Network Communications Device 174, Internet 176 (Wide Area Network), Internet Service Provider 178, Client Smart Phone/Device 180, Client Remote Game Players 182, System Software & Data Storage 184, Multiplayer Network Communications Device 186, Multiplayer Computer System 188, and Wireless Tablet PC 59 (Wi-Fi Network). Further, comprising sufficient hardware modem, software (WWW browser and/or email program), accessories and peripheral devices based at an Internet Service Provider (ISP) 178 location. In communication via the Internet and/or World Wide Web 178 (WWW) via HTTP from the server to a client or with other computers, laptops, iPods®, iPads®, tablets, smart phones 180 or other remote input devices 180 comprising sufficient hardware 184, software 184 (WWW browser and/ or email program), accessories and peripheral devices, and HTML or XML electronic pre-configured forms/monitor screens for input of players of the game using any other types of electronic communications (either wired or wireless). During an online event, a spectator process monitors 168 a state of the event, updating a spectator model, so that spectator data streams can be generated and provided to spectators 172. The spectator data streams can be formatted and provided with content appropriate for use by different types of spectator devices used by the spectators. All components of the above-mentioned system are well known in the art.

FIG. 10 diagrams embodiments of the invention which may also be directed to computer 170 products comprising software stored on any computer useable medium. Such software, when executed in one or more data processing device, causes a data processing device(s) to operate as described herein. Embodiments of the invention employ any computer 170 useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage INPUT devices 186, MEMS, nanotechnology based storage device, etc.), and communication mediums (e.g., wired and wireless communications networks, local area networks, wide area networks, intranets, etc.) via modems 174 and computer game consoles 188 to players 182.

Consequently, if a fly ball strikes anywhere over the confines of the outfield home run wall, the ball is counted as a home run. Slide zones, or force out areas, where force out is assessed if base runner is advancing or retreating are considered to be within thirteen feet of first, second, third base and twenty-six feet of home base. Intermission is acknowledged between the fourth and fifth innings of a seven to eight inning contest. The arena baseball version of the game includes a pitcher pick off base runner attempt limit of three per base within an inning and a balk awarded for a violation of this rule. The designated hitter for the pitcher is available for fielding at least one out per inning or a cumulative number for the game duration. Each team preferably has seven or more available players, although only five may take the field defensively at a time.

The teams take turns batting and fielding with the end of each inning being determined by three batters out. Once a batter has exhausted seven pitches without securing a base via a walk, a hit or a hit batsman, that batter is considered out by default. Last pitched ball being struck at and missed, and the last one caught, is an out. If the last pitch is not caught, it is considered fair, and the striker bound to run ruling an out by strikeout. A ball batted into any type of rebounding assembly is typically deflected and returned live into the playing field.

A further version of the game method of play of the present invention uses a modified baseball diamond and outfield, with or without organized sports leagues, professional and/or amateur. Yet another version uses a computer 170 to simulate via a monitor 168 the game for at least one remote player 172. Alternate embodiments utilize the Internet and World Wide Web for at least one, a plurality, some or many players 182 to interact, compete and entertain themselves, alone or in combination, with the video game 184 as the above referenced virtual participants or remote players 172 & 182.

Night Baseball, alternate additional Glow in the Dark embodiments are shown in FIG. 12 as a partially schematic elevational view. The glow in the dark elements are projected by laser and phosphoreus. The arena has a reflective phosphorous applied playing area FIGS. 1,2,3,6 & 13 as on field lines, attachments or bases 20, 22, 24, 26, 28, 30, 122, 124, 126, 128, 130, 132, 134, & 233. "Night Baseball" lighting (laser/black) reflects the game play visual (tracking) accentuation elements of the system of the present invention for facilitating the accurate game action and game information collection function. FIG. 12 illustrates phosphoreus laden mode of play and action: Live Player (Batter) 220; Live Player Accentuation Elements 221; Base (Playing Surface) Accentuation Elements 222; Player Helmet Accentuation Elements 223, Ball (within Strike Zone Detection) 224a; Ball (outside Strike Zone Detection) Accentuation Elements 224b; Bat Accentuation Elements 225; Strike Zone Detection Grid 226; and Strike Zone Visual Detection Area 228 as the focal point of the "Night Baseball" competition.

Additional miscellaneous rules include the following: Base runners do not need to tag the base before advancing on fly balls. Base runners may advance on foul balls in play. The game starts with the toss of a coin. The team that wins the coin toss decides whether to bat, play defense, or render the choice to the other team. An infielder cannot tag out a runner at any base. An infielder can only tag a base runner out at home plate. An arena baseball game method of play comprising the steps associated with the play of a game of American baseball except for alternate arena baseball game method of play steps, the alternate arena baseball game method of play steps comprising: providing an arena baseball field, the arena baseball field comprising a generally planar field playing surface, a padded fence wall at least partially surrounding the playing surface, a panel wall extending up from the padded fence wall on at least a portion thereof, and an enclosing net wall extending up from the panel wall and/or the padded fence wall; playing no less than five players for each team on both offense and defense; playing at least seven innings of play, with a maximum of two extra innings; determining the winner of the game by adding a number of runs for each team, with the winning team having the higher numerical result; determining the winner of a tie game after two extra innings by adding a number of runs to a number of hits and subtracting a number of errors for each team, with the winning team having the higher numerical result; throwing a maximum of no less than seven pitches to each batter, wherein a second foul ball after a full count results in the batter being called out; fielding balls hit or thrown into contact with the padded fence walls, the panel walls, or the enclosing net wall, that rebound onto the playing field or into the space above the playing field, wherein the balls may be fielded and remain in play; limiting the number of times a pitcher may attempt to pick off a base runner to at most three per base within an inning; allowing base runners to advance on a fly ball regardless of whether the fly ball is caught; allowing a designated fielder position that may be activated under specific conditions by a team for at least one out of at least one inning of play; and limiting the time duration of the game method of play to a pre-set period of time.

The game method of play further comprising the step of providing electronic automated game action calling devices wherein rulings on pitches (strike 224a or balls 224b and marginal calls 228), fair balls, and outs are made automatically by the calling devices. The game method of play of further comprising the step wherein tourney competition, an advancing team is allowed to obtain or acquire players from its eliminated opponent's roster for play within the next playoff round.

The arena floor may preferably be covered with a synthetic turf infill composition made with recycled rubber from high-performance footwear. Containing highly optimized consumer-grade rubber granules placed all around the indoor field such as with soccer and football. The pitcher's mound is placed at a distance less than sixty-six feet away from home plate and is located between home plate and second base. A curved infield line is placed in the proximity of first, second and third base, marking the infield fly area. A curved line is placed in the outfield marking the outfield wall or home run zone. The Rounder configuration bases (see FIG. 6) are laid out in a manner similar to a baseball diamond, except that home base 128 is a separate base, and is at right-angles to third base and the batman's base 122.

Although the present invention has been described in conjunction with a number of preferred embodiments, those skilled in the art will recognize that certain modifications to these systems and methods may be made without deviation from the spirit and scope of the present invention. As indicated above, although the game of American Baseball and the methods for audience participation in the game (both locally and remotely) provide the best example of the beneficial uses of the systems and methods of the present invention, other ball games may likewise benefit from the arena ball systems and processes described herein. In addition, various systems for the remote participation of spectators beyond those that have been described herein, most of which relate the wide area viewing of the live game events, are anticipated. Those skilled in the art will recognize that modifications to the systems and methods that are described above that are specific to a particular game method of play will not necessarily depart from the spirit and scope of the invention.

I claim:

1. Arena baseball virtual reality system comprising: at least one game station including: at least one virtual reality space for being occupied by a user, the virtual reality space having a floor surface for supporting the user and outer boundaries of the virtual reality space, the floor surface extending to the outer boundaries of the virtual reality space;
   at least one virtual reality outfit having an input device for subjecting the user in the virtual reality space to visual and audio stimuli upon the receipt thereof and a plurality of output devices including a movement sensor for generating an output signal upon the detection of a movement of the user in the virtual reality space and an audio sensor for generating the output signal upon the detection of a vocalization of the user in the virtual reality space; and
   a plurality of auxiliary sensory mechanisms for subjecting the user to various feeling sensory conditions upon the actuation of the mechanisms; and
   a server connected to each game station and adapted to transmit the audio and visual stimuli and further actuate a predetermined number of the auxiliary sensory mechanisms as a function of each of the output signals of the game station; and
   a card reader for removably accepting, reading, and writing on a card having a unique identification code and credits stored thereon;
   a server situated remote from the game stations and connected to each of the game stations over a communication network via a pair of modems, the server being adapted to transmit the audio and visual stimuli, the server being adapted to actuate a predetermined number of the auxiliary sensory mechanisms via a first one of the modems as a function of each of the output signals of a predetermined number of the game stations and further as a function of the identification code and credits read by each card reader, the server further being adapted to transmit via a second one of the modems the audio and visual stimuli to a predetermined number of the game stations for storage in memory of the designated game stations;
   and a plurality of viewing screens each connected to the server over the communication network for viewing the audio and video stimuli received by a selected one of the game stations:
   (a) an interactive arena baseball-theme game that is played along with a live sporting event, the sports-theme game comprising: a score-keeping user interface comprised of a writable medium, the score-keeping user interface comprising an information area for recording scores for a home player and a visitor player, and an information area for recording innings and outs; a printed list displaying a plurality of possible outcomes and an associated point value for each of the possible outcomes, for a play of the live sporting event;
   wherein a system for enabling spectators to follow play in an online game or other online event without requiring a spectator device to execute the online game or other online event; and
   wherein one or more computer storage media storing computer executable instructions for performing a system of distributing game telemetry data corresponding to a game session of a video game to a spectator client to allow a user of the spectator client to spectate the game session, said one or more computer storage media comprising steps of: receiving at a network location not joined in the game session, game telemetry data generated by one or more participant clients of the game session of the video game, each participant client executing the video game under the control of a corresponding participant player;
   the network location creating a spectator feed by aggregating the received game telemetry data;
   receiving a request for the spectator feed from a spectator client not participating in the game session; the network location sending the spectator feed over the computer network to the spectator client; executing the video game on the spectator client using the received game telemetry data wherein the game telemetry data comprises projectile information; and
   wherein the one or more participant clients and the spectator client each comprise a game console; and
   wherein the data streams comprise at least one of audio data and visual data provided by a media server to the spectator devices over at least one network; and
   wherein the at least one network comprises at least one of the satellite, internet network, a telephone network, a local area network, a wireless network, a radio network, and a television network; and
   wherein the plurality of possible outcomes comprises single, double, triple, home run, fly out, force out, ground out, and strike out; and
   wherein the list displaying the plurality of possible outcomes further comprises balk, walk, dropped third strike, bit by pitch, pick-off, and stolen base; and
   (b) an arena baseball game communication system comprising at least a first and second simulcast station at a first remote site, a system of generating information from an athletic event comprising:
   receiving a first aspect of a first object in the athletic event;
   receiving a second aspect of a second object in the athletic event;
   determining a data representation with a processor based on the first aspect of the first object relative to the second aspect of the second object;

and storing the data representation in a data server communication system;

further comprises a plurality of simulcast stations distributed among a plurality of remote sites and where a subset of the plurality of simulcast stations communicates on the first communication resource and wherein the simulcast stations are connected by an Internet Protocol network and the simulcast stations that communicate on the first communication resource share a multicast Internet Protocol address;

and (c) a baseball system for handling a game event input between disparate software or hardware platforms, the system comprising: wherein the receiving a first aspect includes receiving a motion of a first object, and wherein the receiving a second aspect includes receiving a formation of a set of athletes in the athletic event, and wherein the determining a data representation includes determining or evaluating a play: an event module stored in memory and executable by a processor to: recognize an event game associated with a first platform, the event having semantic context, and translate the game event into a syntax recognizable by a second platform whereby the semantic context of the event associated with the first platform is communicated to a component of the second platform;

and software stored in memory and associated with the component of the second platform, wherein the execution of the software by a processor causes the translated syntax of the game event module to effectuate the semantic context of the event for the first platform at the component of the second platform.

2. A system for implementing the play of a sports competition game, the sports competition game comprising a modified version of American baseball and involving a plurality of players participating and a plurality of fans in attendance, the system comprising:
  (a) a planar field playing surface having an infield, an outfield, a home plate, a pitcher's mound, and at least three bases, each of the home plate and the at least three bases further comprising a force out zone around them;
  (b) a padded fence wall extending up from and at least partially surrounding the field playing surface, the padded fence wall extending at least to a height sufficient to soften the impact of a player of the game when the player comes into contact with the padded fence wall;
  (c) a clear vision-enabled panel wall extending up from the padded fence wall on at least a portion thereof, the vision-enabled panel wall positioned adjacent to the infield of the field playing surface, a portion of the panel wall closest to home plate forming a backstop wall; and
  (d) a tension net wall extending up from the vision-enabled panel wall and/or the padded fence wall, the tension net wall at least partially enclosing a space around and above the field playing surface, the tension net walls comprising:
    (i) first and second side net walls positioned to either side of the field playing surface as directed outward from home plate;
    (ii) an outfield net wall positioned opposite from home plate adjacent the outfield of the field playing surface; and
    (iii) a ceiling net wall covering the field playing surface and connected to the first and second side net walls and the outfield net wall;
  (e) a scoreboard display comprising a game time clock, and scoring indicia;
  (f) an array of fan seats positioned outside but adjacent to at least a portion of the padded fence wall, the vision-enabled panel wall, the tension net wall, the array of fan seats placing the fans in attendance in close proximity to play of the game on the field playing surface; and
  (g) a plurality of electronic devices for providing audience participation;
  (i) a clock for time regulation;
  (j) duration of the game may be divided into increments of time displayed by the game clock, said increments of time such as a whole, halves and/or quarters with overtime periods and within said increments rounds or turns at bat;
  (k) a glow in the dark planar field playing surface having a phosphorous laden infield, an outfield, a home plate, a pitcher's mound, equipment, uniforms and at least three bases, each of the home plate and the at least three bases further comprising a force out zone around them;
  (l) an infield and at least four bases, said base(s) having an outside diameter
  and wherein the improvement comprising an outside diameter or distance from said base whereby an umpire may, by reference to the base to determine whether a player is positioned in close proximity to initiate or invoke base force zone rules of the game, whereby a defensive player within a predetermined distance and engaging the base in control of ball prior to offensive player does not require tag out.

3. The system for implementing the play of a sports competition game of clam 2 further comprising:
  (a) Ball tracking or wireless global positioning system sensors;
  (b) Jai Alai baseball game equipment;
  (c) Player tracking wireless or global position system sensors.

* * * * *